(12) United States Patent
Anwer et al.

(10) Patent No.: US 11,879,536 B2
(45) Date of Patent: Jan. 23, 2024

(54) ROTARY DEVICE WITH CHAMBERED MEMBER AND METHOD OF MAKING SAME

(71) Applicant: Litens Automotive Partnership, Woodbridge (CA)

(72) Inventors: Ahmed Abdul Wadood Anwer, Toronto (CA); Frank Verriet, Woodbridge (CA); Sean Kieran, Woodbridge (CA); Andrew Malcolm Boyes, Aurora (CA)

(73) Assignee: LITENS AUTOMOTIVE PARTNERSHIP, Woodbridge, CA (US)

( * ) Notice: Subject to any disclaimer, the term of this patent is extended or adjusted under 35 U.S.C. 154(b) by 192 days.

(21) Appl. No.: 17/753,168

(22) PCT Filed: Aug. 18, 2020

(86) PCT No.: PCT/CA2020/051128
§ 371 (c)(1),
(2) Date: Feb. 22, 2022

(87) PCT Pub. No.: WO2021/030909
PCT Pub. Date: Feb. 25, 2021

(65) Prior Publication Data
US 2022/0299099 A1 Sep. 22, 2022

Related U.S. Application Data

(63) Continuation-in-part of application No. PCT/CA2019/051277, filed on Sep. 10, 2019.
(Continued)

(30) Foreign Application Priority Data

Sep. 10, 2019 (WO) ................ PCT/CA2019/051277

(51) Int. Cl.
*F16H 55/36* (2006.01)
*F02B 67/06* (2006.01)
(Continued)

(52) U.S. Cl.
CPC ............. *F16H 55/36* (2013.01); *F02B 67/06* (2013.01); *F16F 15/123* (2013.01); *F16H 7/20* (2013.01);
(Continued)

(58) Field of Classification Search
CPC ...... F16H 55/36; F16H 7/20; F16H 2055/366; F02B 67/06; F16F 15/123; F16F 2222/08;
(Continued)

(56) References Cited

U.S. PATENT DOCUMENTS 5,168,774 A * 12/1992 Andra ................... F16H 55/44
464/89
6,048,284 A 4/2000 Gerhardt et al.
(Continued)

FOREIGN PATENT DOCUMENTS

CN 204677683 U 9/2015
DE 102015205247 A1 10/2015
(Continued)

OTHER PUBLICATIONS

International Search Report and Written Opinion from corresponding PCT Application No. PCT/CA2020/051128 dated Nov. 2, 2020.
(Continued)

*Primary Examiner* — Gene O Crawford
*Assistant Examiner* — Emily R Kincaid
(74) *Attorney, Agent, or Firm* — Aird & McBurney LP

(57) ABSTRACT

In one aspect, a rotary device is provided, and includes a shaft adapter, a chambered member, a seal member and at least one internal torque transfer member. The shaft adapter is connectible to a crankshaft or accessory shaft and defines
(Continued)

an axis. The chambered member (e.g. a pulley) is rotatably connected to it, and at least partially encloses a chamber (e.g. for oil), and includes a circumferential portion, a first side wall, and a second side wall which is a separate member from the circumferential portion. One of the circumferential portion and the second side wall has projections thereon, and the other has valleys that mate with the projections with no clearance, so as to be able to transfer a torque of at least 10 Nm into one another without plastic deformation. A seal member is compressed between the second side wall and the circumferential portion.

13 Claims, 10 Drawing Sheets

Related U.S. Application Data

(60) Provisional application No. 62/889,558, filed on Aug. 20, 2019, provisional application No. 62/987,727, filed on Mar. 10, 2020.

(51) Int. Cl.
  *F16F 15/123* (2006.01)
  *F16H 7/20* (2006.01)
  *B60K 25/02* (2006.01)

(52) U.S. Cl.
  CPC .......... *B60K 25/02* (2013.01); *F16F 2222/08* (2013.01); *F16F 2230/30* (2013.01); *F16F 2232/02* (2013.01); *F16F 2236/08* (2013.01); *F16H 2055/366* (2013.01)

(58) Field of Classification Search
  CPC ............... F16F 2230/30; F16F 2232/02; F16F 2236/08; B60K 25/02
  USPC .......................................................... 474/94
  See application file for complete search history.

(56) References Cited

U.S. PATENT DOCUMENTS

| | | | |
|---|---|---|---|
| 6,062,104 A | 5/2000 | Allport | |
| 9,581,232 B2 | 2/2017 | Odenmarck et al. | |
| 9,581,233 B2 | 2/2017 | Manzoor | |
| 9,989,103 B2 | 6/2018 | Antchak et al. | |
| 10,041,578 B2* | 8/2018 | Dell | B60K 25/02 |
| 10,125,856 B2* | 11/2018 | Dell | F16D 3/66 |
| 10,267,405 B2* | 4/2019 | Dell | B60K 25/02 |
| 2007/0249442 A1* | 10/2007 | Grunau | F16H 55/36 |
| | | | 474/94 |
| 2018/0045288 A1 | 2/2018 | Cariccia et al. | |
| 2018/0051792 A1* | 2/2018 | Cariccia | F16F 15/123 |
| 2018/0163788 A1* | 6/2018 | Dell | |

FOREIGN PATENT DOCUMENTS

| | | |
|---|---|---|
| JP | 2001159448 A | 6/2001 |
| JP | 2018105497 A | 7/2018 |
| WO | 2011160215 A1 | 12/2011 |
| WO | 2017139870 A1 | 8/2017 |
| WO | 2018154509 A1 | 8/2018 |
| WO | 2020051694 A1 | 3/2020 |
| WO | 2020051694 A9 | 3/2020 |

OTHER PUBLICATIONS

International Search Report and Written Opinion from PCT Application No. PCT/CA2019/051277 dated Nov. 12, 2019.
English translation of JP 2018105497 from Google Patents dated Feb. 22, 2022.
English translation of DE 102015205247 from Google Patents dated Feb. 22, 2022.

* cited by examiner

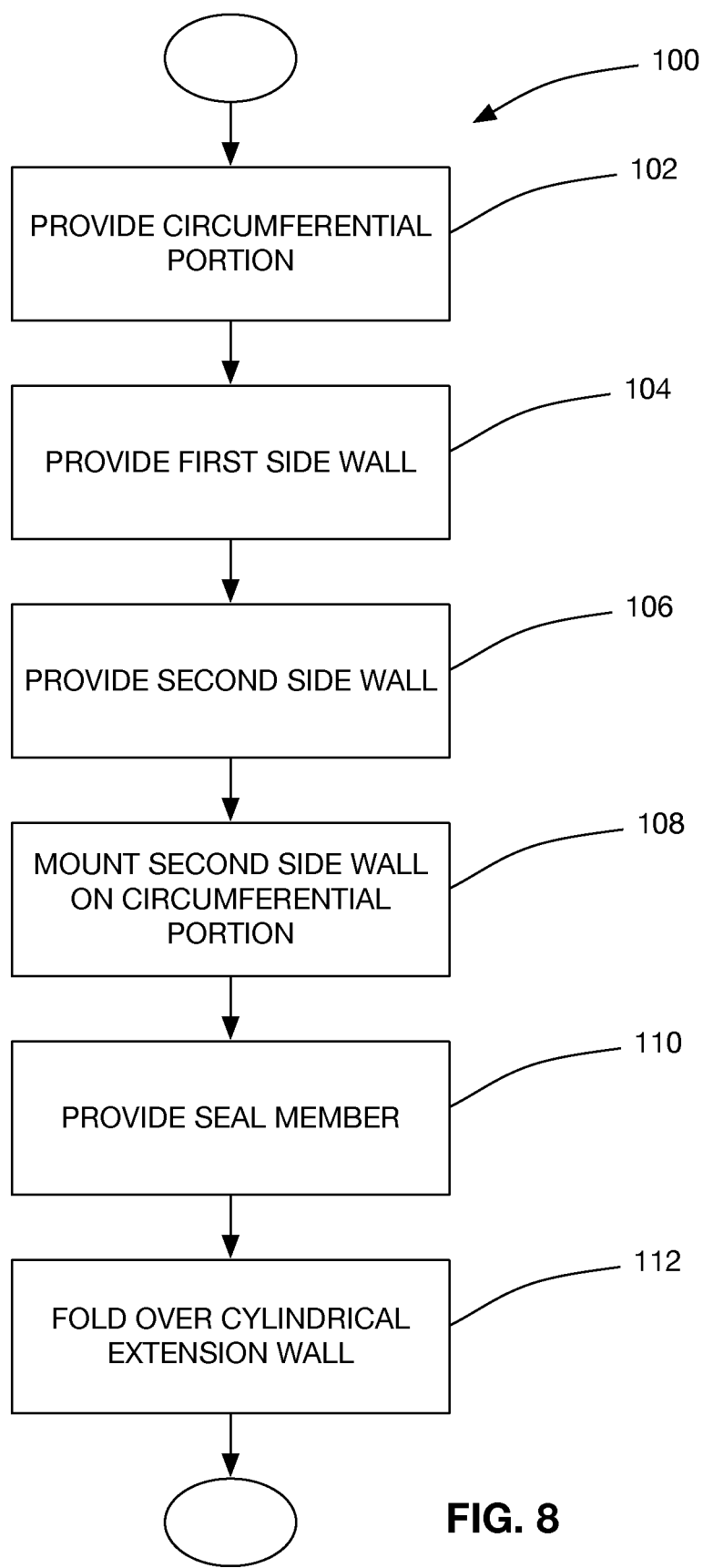

ROTARY DEVICE WITH CHAMBERED MEMBER AND METHOD OF MAKING SAME

CROSS-REFERENCE TO RELATED APPLICATIONS

This application is a national phase entry of PCT/CA2020/051128 filed Aug. 18, 2020, which claims the benefit of U.S. Provisional Patent Application No. 62/889,558, filed Aug. 20, 2019, PCT Patent Application PCT/CA2019/051277, filed Sep. 10, 2019, and U.S. Provisional Patent Application No. 62/987,727, filed Mar. 10, 2020, the contents of all of which are incorporated by reference as if fully set forth in detail herein.

FIELD

The specification relates generally to rotary devices in a vehicular engine that transfer torque between a shaft and an external torque member such as a belt.

BACKGROUND OF THE DISCLOSURE

It is known to provide rotary devices such as pulleys in various places on a vehicular engine. These devices are, in some cases, filled with a liquid and have one or more internal torque transfer elements in order to transfer torque between a belt engagement surface of the pulley, and a shaft to which the pulley is mounted. Such pulleys can be labour-intensive and expensive to manufacture, incorporating long joints that are welded. It would be beneficial to provide a rotary device that is less labour-intensive and/or less expensive to manufacture.

SUMMARY OF THE DISCLOSURE

In one aspect, there is provided a rotary device, comprising a shaft adapter, a chambered member, a seal member and at least one internal torque transfer member. The shaft adapter is connectible to a shaft that is either an engine crankshaft or is an accessory shaft that holds a rotational functional element of a vehicle accessory. The shaft adapter defines an axis. A chambered member that is rotatably connected to the shaft adapter. The chambered member may optionally include an exterior drive surface that is engageable with an external torque member so as to transmit torque between the external torque member and the rotary device. The chambered member at least partially encloses a chamber. The chambered member includes a circumferential portion on which the exterior drive surface is positioned, a first side wall, and a second side wall, wherein the second side wall is a separate member from the circumferential portion. One of the circumferential portion and the second side wall has a first torque transfer surface with a plurality of projections thereon that extend at least partially axially or partially radially, and the other of the circumferential portion and the second side wall has a second torque transfer surface thereon with a plurality of valleys that mate with the plurality of projections with no clearance therebetween in a circumferential direction, such that the first torque transfer surface and the second torque transfer surface can transfer a torque of at least 10 Nm into one another without plastic deformation of the second side wall and of the circumferential portion. A seal member that is compressed between the second side wall and the circumferential portion. One of the second side wall and the circumferential portion has an axial locking projection that is sandwiched axially between a first shoulder and a second shoulder in the other of the second side wall and the circumferential portion with no axial clearance between the axial locking projection and the first and second shoulders, so as to lock the second side wall axially relative to the circumferential portion. At least one internal torque transfer member in the chamber, and positioned to transfer torque between the shaft adapter and the second side wall.

In a method of making a chambered member for a rotary device is provided, and includes:

a) providing a circumferential portion having an exterior drive surface thereon, wherein the exterior drive surface is engageable with an external torque member so as to transmit torque between the external torque member and the rotary device, wherein the circumferential portion has an internal shoulder, and a cylindrical extension wall that extends axially from the internal shoulder;

b) providing a first side wall, wherein the first side wall and the circumferential portion together partially enclose a chamber;

c) providing a second side wall, wherein the second side wall is a separate member from the circumferential portion, the second side wall has an inner side wall surface, an outer side wall surface and an edge face between the inner and outer side wall surfaces,
wherein one of the second side wall and the circumferential portion has a first torque transfer surface with a plurality of projections thereon that extend at least partially axially or partially radially, and the other of the circumferential portion and the second side wall has a second torque transfer surface thereon;

d) mounting the second side wall on the circumferential portion such that the second side wall is supported by the internal shoulder, the inner side wall surface in part defines the chamber, and the edge face faces a first axial portion of the cylindrical extension wall;

e) providing a seal member;

f) folding over a second axial portion of the cylindrical extension wall against the outer side wall surface, thereby sandwiching an axial locking projection on the second side wall axially between the internal shoulder on the circumferential portion and a second shoulder on the circumferential portion formed by the second axial portion, so as to lock the second side wall axially relative to the circumferential portion, and so as to compress the seal member between the second side wall and the circumferential portion
wherein, during at least one of steps d) and f) the plurality of projections project into and deform the second torque transfer surface to generate a plurality of valleys in the second torque transfer surface that have no clearance in a circumferential direction with the plurality of projections, such that the first torque transfer surface and the second torque transfer surface can transfer a torque of at least 10 Nm into one another without plastic deformation of the second side wall and of the circumferential portion.

In another aspect, a method of making a rotary device is provided, and includes:

l) providing a chambered member by carrying out a)-f) described above;

m) providing a shaft adapter that is connectible to a shaft that is either an engine crankshaft or is an accessory shaft that holds a rotational functional element of a vehicle accessory, wherein the shaft adapter defines an axis; and n) providing at least one internal torque transfer member in the chamber and positioned to transfer torque between the shaft adapter and the second side wall.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings.

Figure 2:
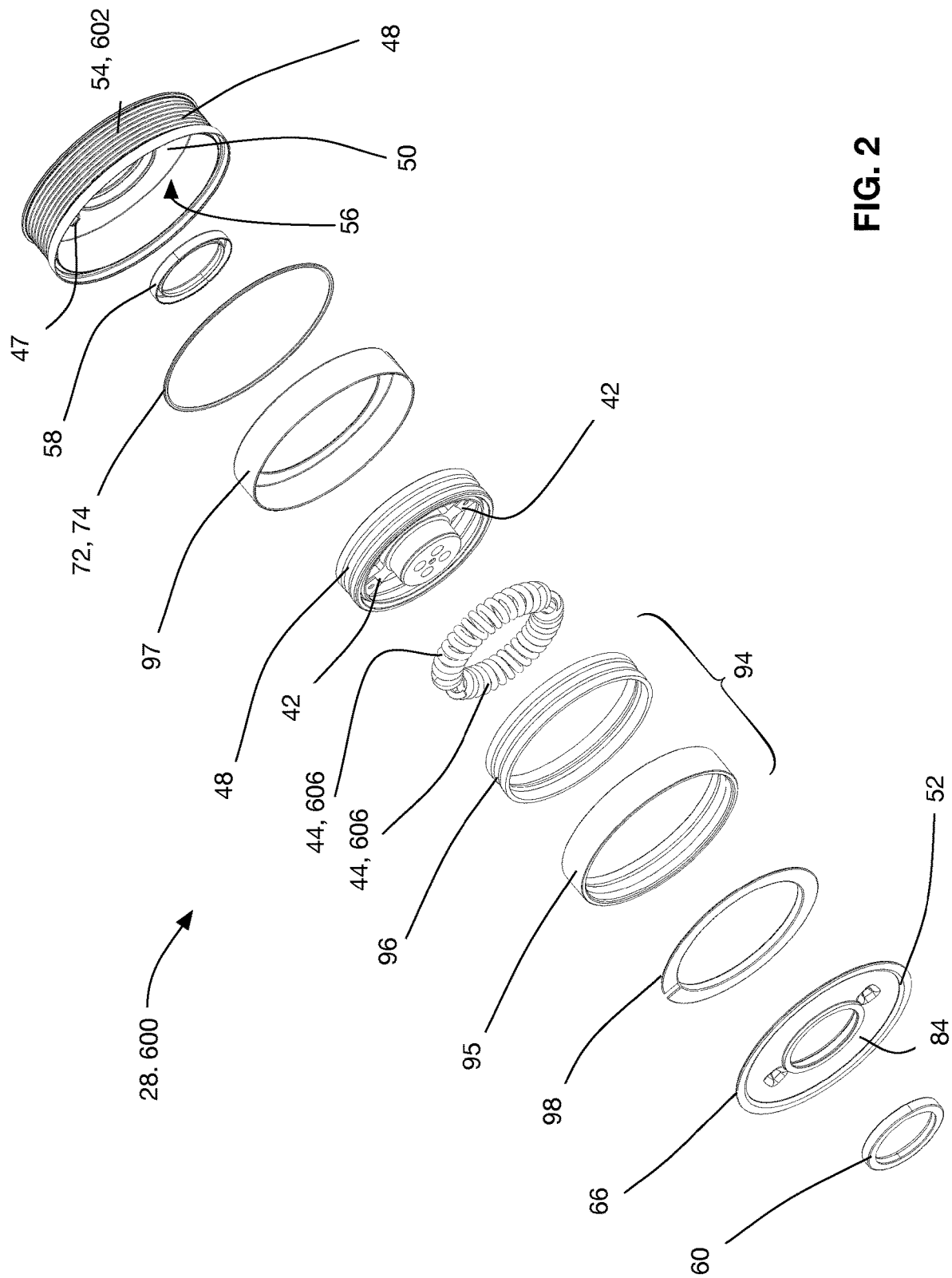
FIG. 2 is an exploded view of a rotary device that is incorporated into the internal combustion engine shown in FIG. 1, in accordance with an embodiment of the present disclosure.
Figure 4:
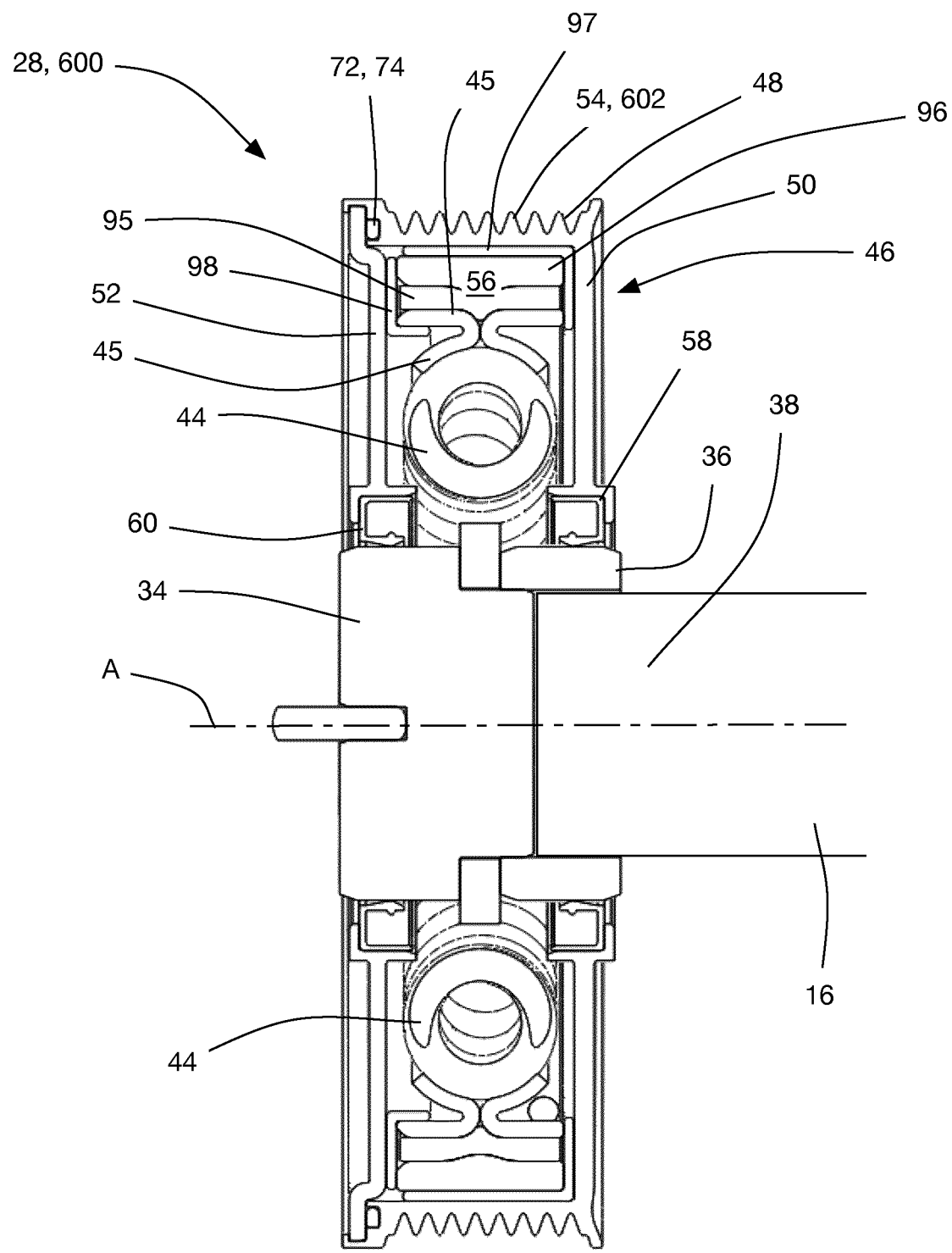

FIG. 4 a sectional side view of the rotary device shown in FIG. 2, in an assembled state.

Figure 5:
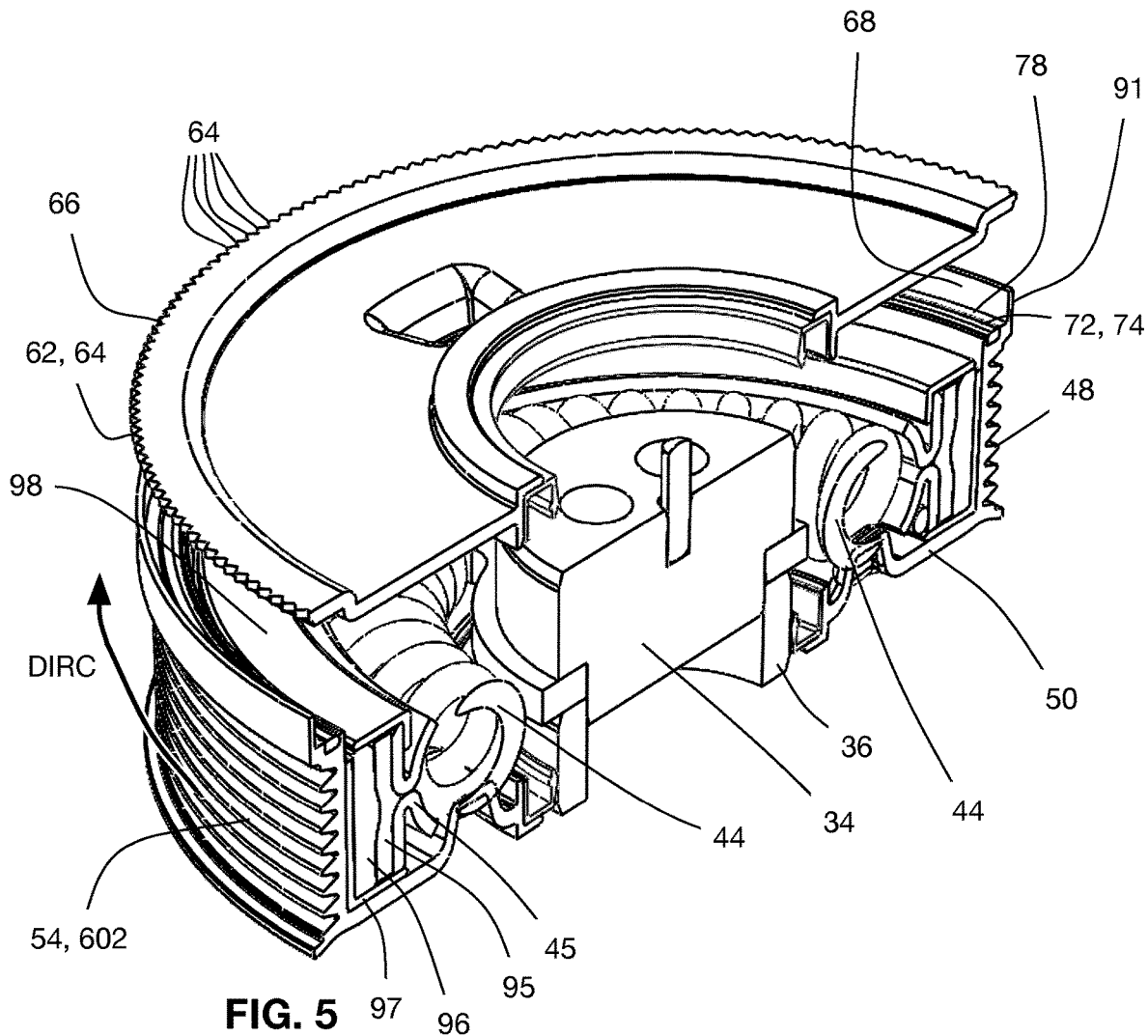

FIG. 5 a sectional perspective view of the rotary device shown in FIG. 2, in the assembled state.

Figure 6:
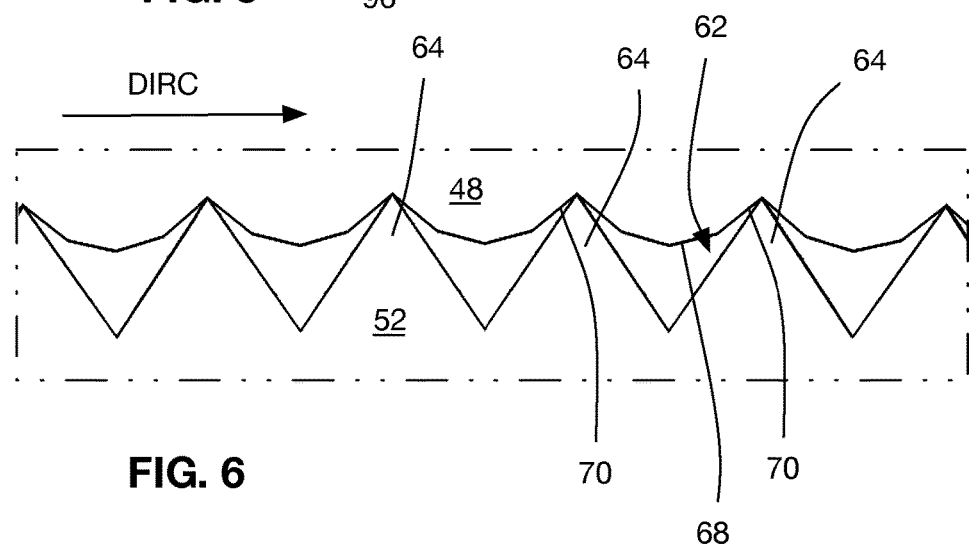

FIG. 6 is a magnified view showing engagement between a first torque transfer surface on one of the components of the rotary device shown in FIG. 2 and a second torque transfer surface on another one of the components of the rotary device shown in FIG. 2.

FIGS. 7A-7D illustrate steps in a method of making the rotary device shown in FIG. 2.

FIG. 8 is a flow diagram illustrating a method of making a rotary device, such as the rotary device shown in FIG. 2.

Figure 9A:
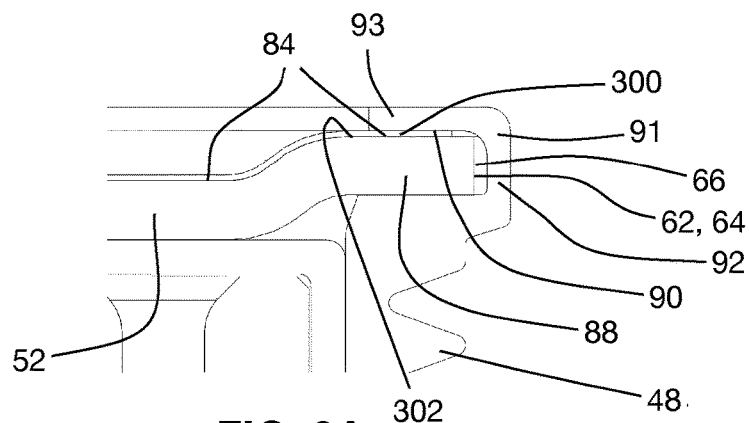

FIG. 9A is a sectional side view of a portion of a rotary device in accordance with an alternative embodiment of the present disclosure.

Figure 9B:
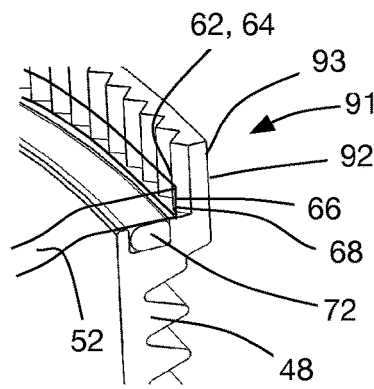
Figure 9C:
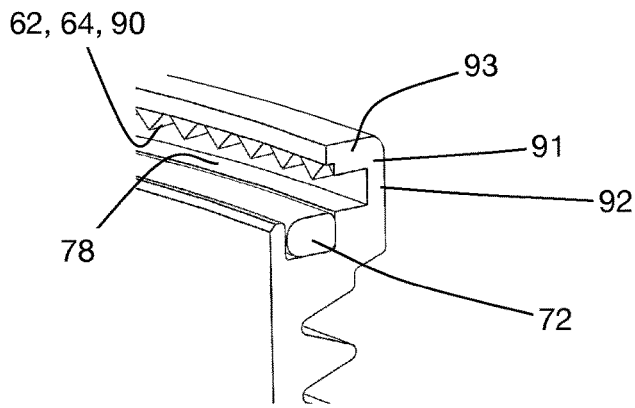
Figure 9D:
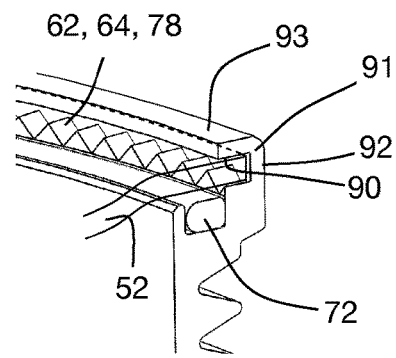

FIGS. 9B-9D are sectional perspective views of rotary devices in accordance with alternative embodiments of the present disclosure.

Figure 9E:
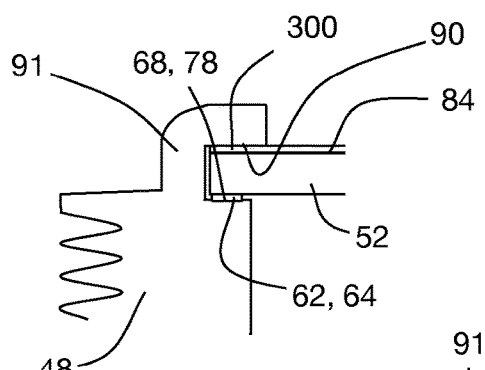
Figure 9F:
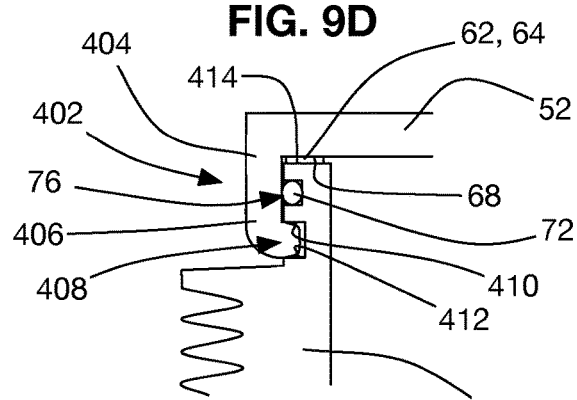
Figure 9G:
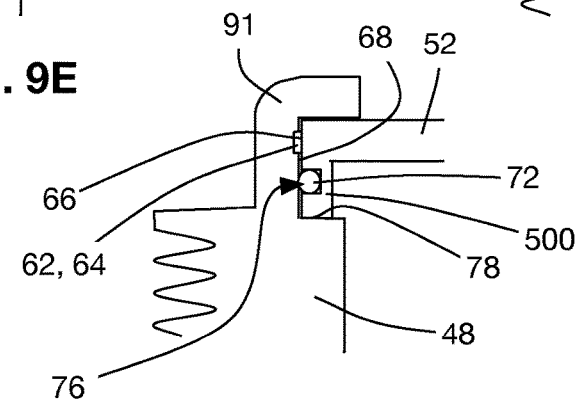

FIGS. 9E-9G are sectional side views of rotary devices in accordance with other alternative embodiments of the present disclosure.

Figure 10A:
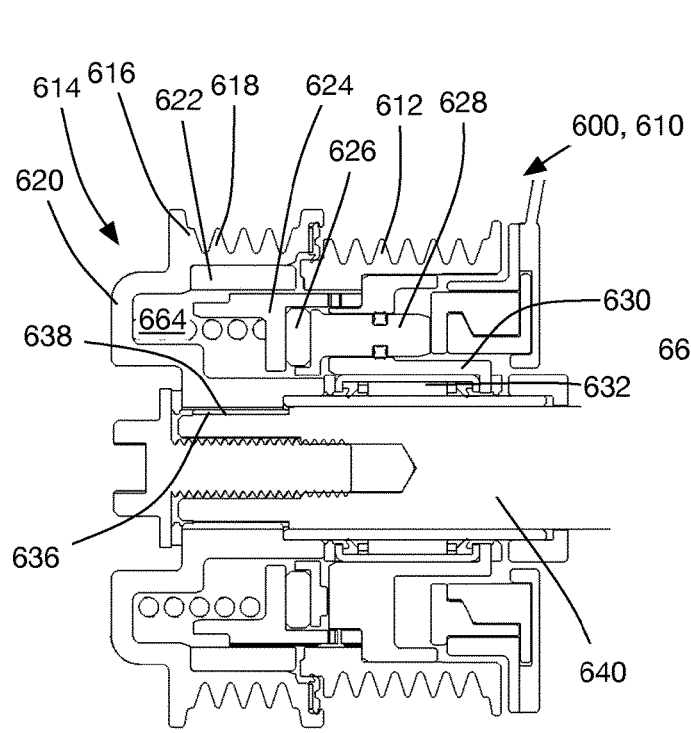

FIG. 10A is a sectional side view of a rotary device in accordance with another alternative embodiment of the present disclosure.

Figure 10B:
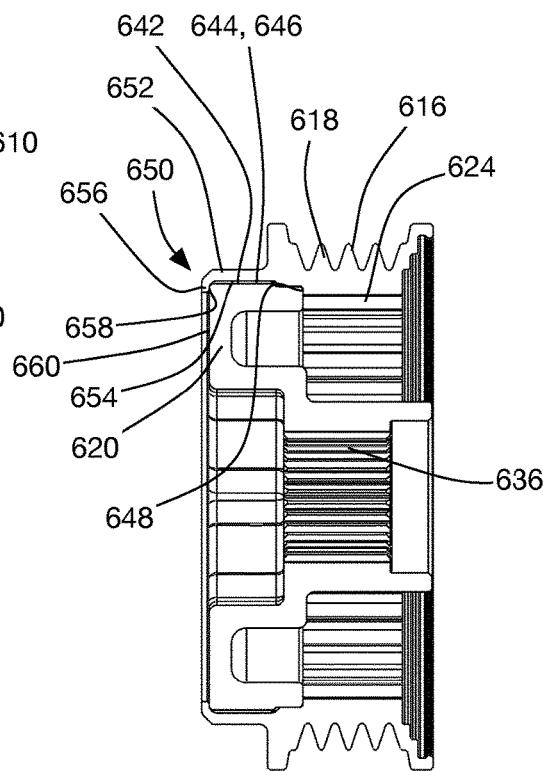

FIG. 10B is a sectional side view of a pulley from the rotary device shown in FIG. 10A.

Figure 11:
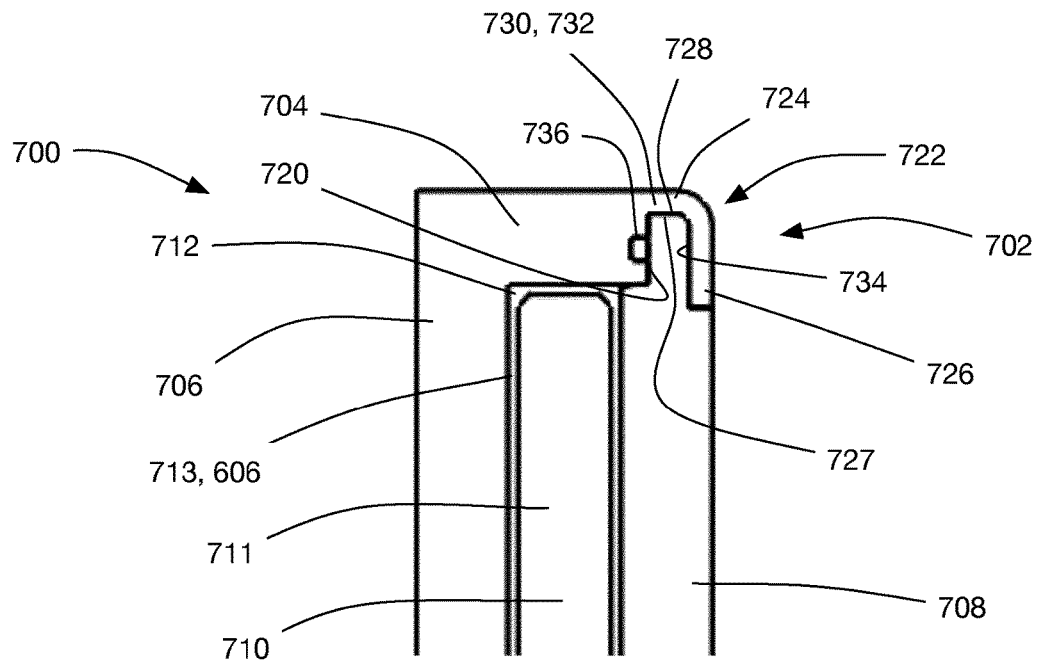

FIG. 11 is a sectional side view of a rotary device in accordance with another alternative embodiment of the present disclosure.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

It will be further noted that the use of the term "a" will be understood to denote "at least one" in all instances, unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Figure 1:
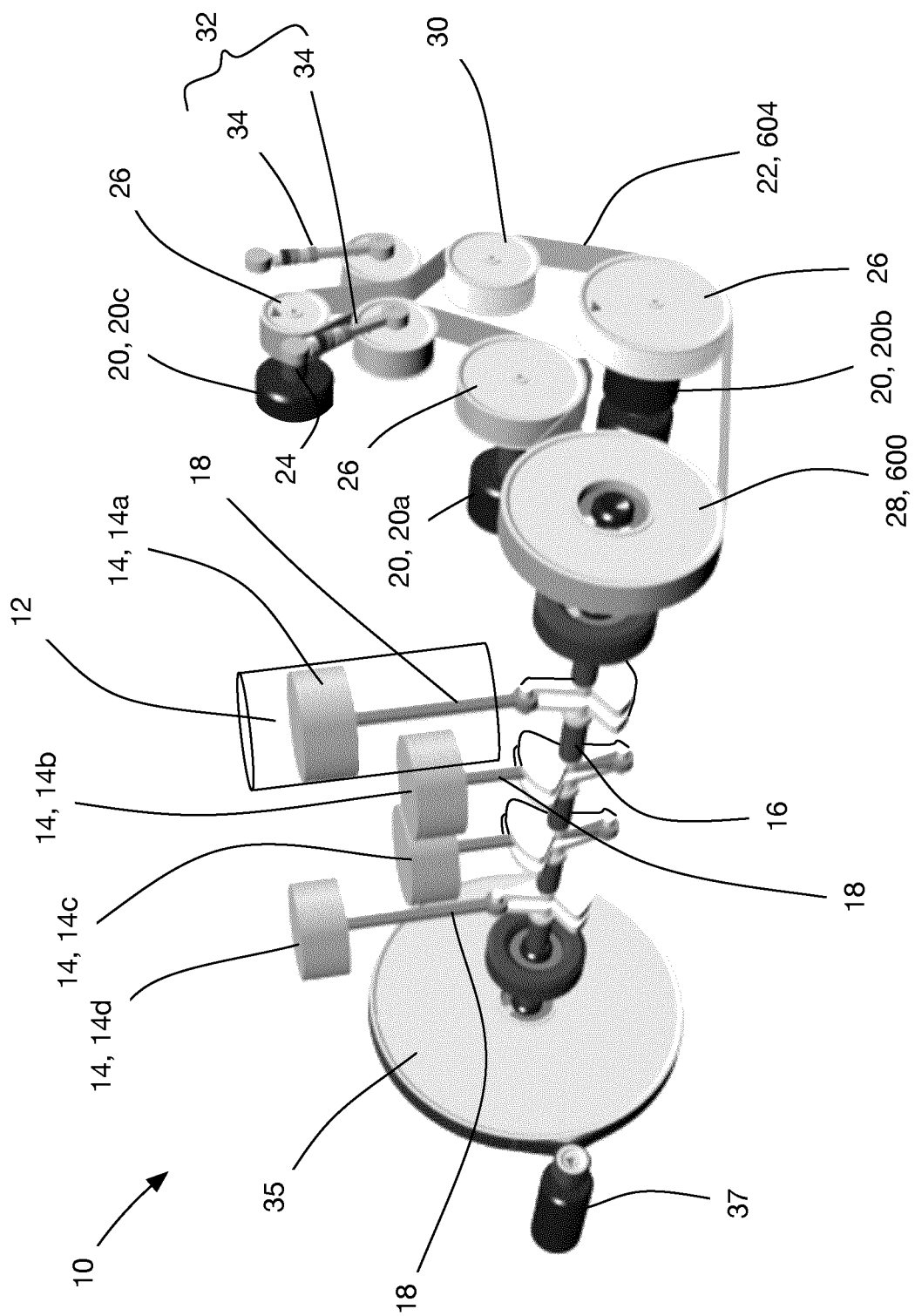
FIG. 1 is a perspective representation of an internal combustion engine for a vehicle.

Reference is made to FIG. 1, which shows a perspective representation of an example of an internal combustion engine 10 for a vehicle. The engine 10 includes a plurality of cylinders, one of which is represented by a pair of lines, with the reference number 12. In each cylinder 12, a piston 14 reciprocates between a top dead center position and a bottom dead center position. In the view shown in FIG. 1, the pistons shown at 14a and 14d are in the top dead center position and the pistons shown at 14b and 14c are in the bottom dead center position. The engine 10 shown is a four-stroke engine. This means that each piston goes through four 'strokes' for each combustion cycle, including an intake stroke where the piston 14 moves to bottom dead center and air is drawn into the cylinder 12 via one or more intake valves (not shown), a compression stroke where the piston 14 moves to top dead center to compress the air that was drawn in. At an appropriate time, fuel is injected into the cylinder 12 and (in a spark-ignition engine) a spark plug is energized to ignite the fuel. This causes a rapid expansion of the gas in the cylinder 12, driving the piston 14 back to bottom dead center in what is referred to as the expansion stroke. At an appropriate time one or more exhaust valves (not shown) are opened and the piston 14 then returns to top dead center to drive the spent expanded gas from the cylinder 12.

Each piston 14 is connected to the crankshaft, shown at 16, via a connecting rod 18. During the expansion stroke in particular, each piston 14 applies a torque to the crankshaft 16 to drive the crankshaft 16 to rotate. The rotation of the crankshaft 16 is transmitted to the vehicle's driven wheels (not shown). The crankshaft 16 is also used to drive one or more accessories 20, via an accessory drive belt shown at 22. Each accessory 20 has a drive shaft 24 with an accessory pulley 26 thereon. The crankshaft 16 has a crankshaft pulley 28 thereon. The accessory drive belt 22, which is typically a poly V belt, extends around the crankshaft pulley 28 and the accessory pulleys 26 so as to transmit power from the crankshaft pulley 28 to the accessory pulleys 26 in order to drive the accessories 20.

The accessories 20 are shown as simple cylindrical shapes but it will be understood that they could have other shapes as needed. Some examples of accessories 20 that may be driven by the crankshaft 16 include a water pump shown at 20a, an air conditioning compressor shown at 20b, and an MGU (motor-generator unit), shown at 20c. The motor-generator unit 20c may be used as a generator in order to charge the vehicle's battery (not shown), or as a motor so as to transmit torque into the accessory drive belt 22 for various purposes.

Other elements shown in FIG. 1 to be engaged with the accessory drive belt 22 include an idler pulley 30 and a tensioner 32. The tensioner 32 is used to maintain tension on the accessory drive belt 22 in situations where the belt tension would otherwise drop to a level where belt slip could occur. The tensioner 32 shown includes two tensioner arms 34, which engage the accessory drive belt 22 on both sides of the MGU 20c, so as to ensure appropriate belt tension both in situations where the MGU 20c is acting as a generator and in situations where the MGU 20c is acting as a motor.

Another element shown in FIG. 1 that is connected to the crankshaft 16 is a flywheel 35, which is connected to a starter motor 37 and is used to rotate the crankshaft 16 when starting the engine 10.

Figure 3:
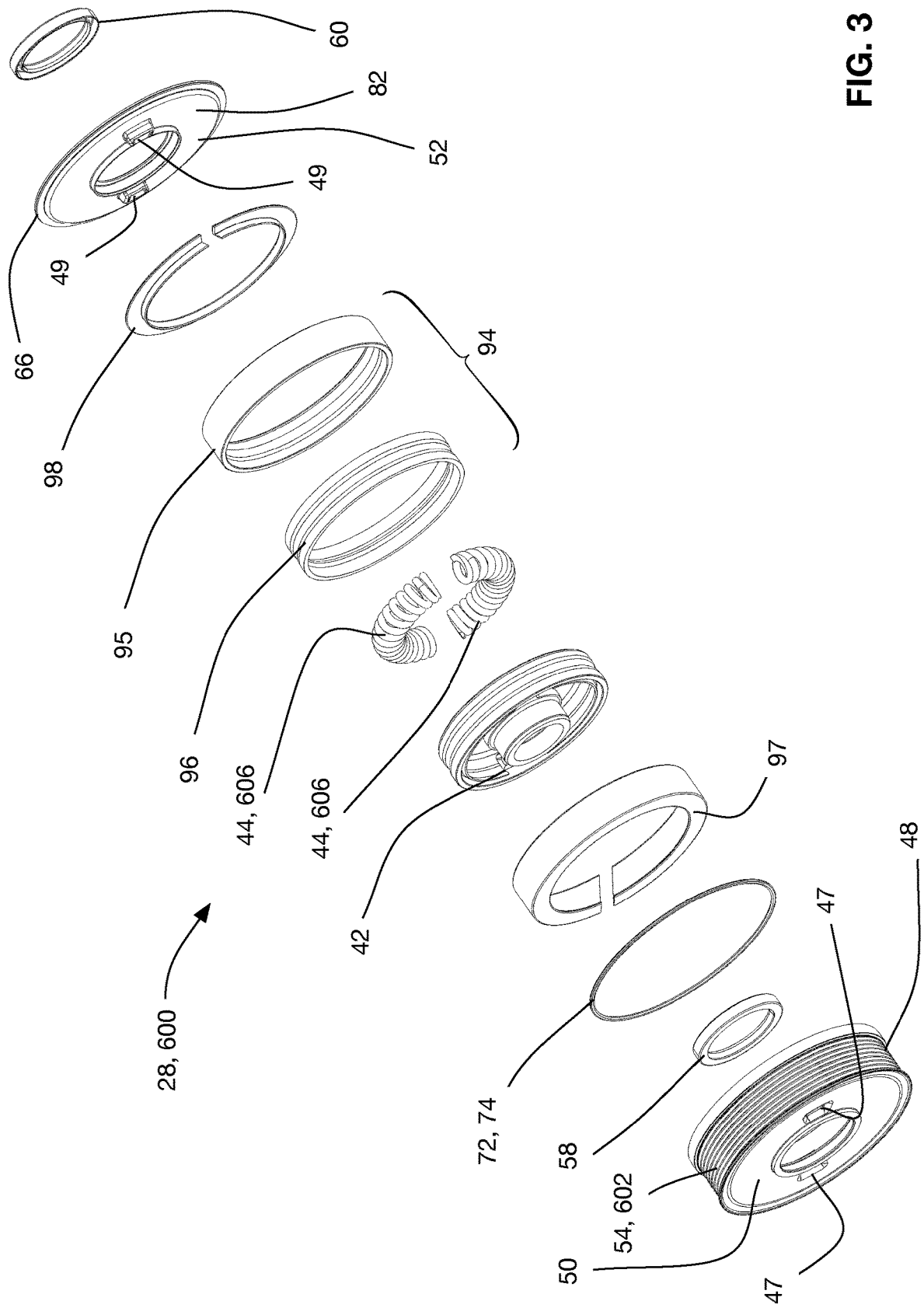
FIG. 3 is another exploded view of the rotary device shown in FIG. 2.

The crankshaft pulley 28 may be an assembly that includes the components shown in FIGS. 2 and 3. In the example shown in FIGS. 2 and 3, the crankshaft pulley 28 is an isolation pulley and includes a shaft adapter 34 that is connectible to the crankshaft 16 in any suitable way. For example, the shaft adapter 34 in FIGS. 2-3 includes a sleeve portion 36 that fits snugly over an end (shown at 38 in FIG. 4) of the crankshaft 16 and has four pass-through apertures 40 through which fasteners (not shown) can be inserted into receiving apertures in the end of the crankshaft 16. Any other suitable way of mounting the shaft adapter 34 to the crankshaft 16 could alternatively be used. The shaft adapter 34 defines an axis A (FIG. 4) for the crankshaft pulley 28.

In the example shown, the shaft adapter 34 includes first and second drive arms 42 that will be used to engage first and second isolation springs 44 for torque transmission therewith. The first and second isolation springs 44 isolate the chambered member 46 from torsional vibrations (referred to as 'torsionals') that are present in the crankshaft 16. The first and second isolation springs 44 shown are arcuate helical compression springs, however any other suitable type of isolation spring may alternatively be used. In some embodiments the first and second isolation springs 44 may be replaced by a single isolation spring, such as a helical torsion spring. Thus it can be said that at least one isolation spring 44 may be employed in the crankshaft pulley 28. The isolation springs 44 are shown as being included in a cage 45 that maintains the isolation springs 44 in their arcuate form during torque transfer through them. The cage 45 is fixedly connected to the shaft adapter 34.

Each of the isolation springs 44 is engaged at a first end with one of the drive arms 42, and at a second end with a pair of drive lugs that are provided on the first and second side walls 50 and 52. Thus, each isolation spring 44 transfers torque in parallel to and from each of the first and second side walls 50 and 52. Because there are two isolation springs 44 shown in the embodiment in FIGS. 2 and 3, there are two drive lugs (shown at 47) provided on the first side wall 50, and two drive lugs (shown at 49) provided on the second side wall 52. The lugs 47 and 49 on each of the first and second side walls 50 and 52 are formed by regions of the first and second side walls 50 and 52 that were pressed-in from their respective outer side wall surfaces. Only one of the lugs 47 is shown in FIG. 2, as the other one is obscured by the circumferential portion 48. While it is shown for the isolation members 44 to transfer torque to and from the first and second side walls 50 and 52 simultaneously, it will be understood that, in some situations, such as if the positions of the lugs 47 and the lugs 49 are not aligned enough with one another angularly, or if the isolation springs happen to be shaped to engage the lugs 49 more than the lugs 47, it is possible that the isolation members 44 could end up transmitting torque to and from the second side wall 52 and for the second side wall 52 to transfer the torque to and from the circumferential portion 48, thereby providing a series transfer of torque instead of a parallel transfer of torque. In some other embodiments, it is possible for the crankshaft pulley 28 to be configured intentionally to transfer torque to and from the isolation springs 44 to and from the circumferential portion 48 in series through the second side wall 52 and not through both the first and second side walls 50 and 52 in parallel.

The crankshaft pulley 28 further includes a chambered member 46. The chambered member 46 has a circumferential portion 48, a first side wall 50 and a second side wall 52 that extend radially inwards from the circumferential portion 48. An exterior drive surface 54 is provided on the circumferential portion and is engageable with the accessory drive belt 22 so as to transmit torque therebetween. In the present example, the exterior drive surface 54 is a poly-V groove face.

The crankshaft pulley 28 at least partially encloses a chamber 56. In the example embodiment shown, the crankshaft pulley 28 is sealingly engaged with the shaft adapter 34 via first and second seal members shown at 58 and 60. The seal members 58 and 60 may be suitable to seal the chamber 56 against fluid leakage out therefrom in embodiments in which the chamber 56 is filled with fluid. Alternatively, the seal members 58 and 60 may be suitable to seal the chamber 56 against the ingress of contaminants into the chamber 56 from the exterior environment.

The chambered member 46 is rotatably connected to the shaft adapter 34. In the present embodiment, this is provided in part by the first and second side walls 50 and 52 of the chambered member 46 being rotationally supported on the first and second seal members 58 and 60, which are themselves directly supported on the shaft adapter 34.

The structure of the chambered member 46 is described in further detail hereinbelow. The first side wall 50 and the circumferential portion 48 may be formed from a single piece of material, such as a single piece of steel or some other suitable metal. The second side wall 52 is a separate member from the circumferential portion 48 (and from the first side wall 50.

One of the circumferential portion 48 and the second side wall 52 has a first torque transfer surface 62 with a plurality of projections 64 thereon that extend at least partially axially or partially radially. In the embodiment shown in FIG. 5, the plurality of projections 64 extend axially along an edge face 66 of the second side wall 52. The other of the circumferential portion 48 and the second side wall 52 has a second torque transfer surface 68 thereon with a plurality of valleys 70 (FIG. 6) that mate with the plurality of projections 64 with no clearance therebetween in a circumferential direction, such that the first torque transfer surface 62 and the second torque transfer surface 68 can transfer a torque of at least 10 Nm into one another without plastic deformation of the second side wall 52 and of the circumferential portion 48. In the example shown, the circumferential portion 48 includes a surrounding wall 71 that has the second torque transfer surface 68 thereon. The surrounding wall 71 thus surrounds and engages the edge face 66.

While a torque of 10 Nm is mentioned as a torque that can be transferred from the first and second torque transfer surfaces into one another it will be noted that testing on sample devices has been carried out by the applicant, and it has been found that 3000 Nm or more of torque have been transferred across the first and second torque transfer surfaces between the second side wall 52 and the circumferential portion 48 with no plastic deformation taking place in the parts in some instances.

A seal member 72 is optionally provided. The seal member 72 is compressed between the second side wall 52 and the circumferential portion 48. In the example shown in FIG. 4, the seal member 72 is an o-ring 74 that is positioned in a groove 76 that is itself positioned on an internal shoulder 78 in the circumferential portion 48. The walls of the groove 76 act as a first sealing surface that is engaged with the o-ring 74. The second side wall 52 has an inner side wall surface 82 that faces the chamber 56, and an outer side wall surface 84 that is opposite the inner side wall surface 82. The edge face 66 is positioned between the inner and outer side wall surfaces 82 and 84. The second side wall 52 further includes a second sealing surface that is part of the inner side wall surface 82 (in the embodiment shown in FIGS. 2-7D), and faces the groove 76 and engages the o-ring 74. The first and second sealing surfaces together compress the seal member 72.

To maintain compression on the seal member 72, one of the second side wall 52 and the circumferential portion 48 has an axial locking projection 88 that is sandwiched axially between a first shoulder and a second shoulder in the other of the second side wall 52 and the circumferential portion 48 with no axial clearance between the axial locking projection 88 and the first and second shoulders, so as to lock the second side wall 52 axially relative to the circumferential portion 48. In the example shown in FIG. 4, the axial locking projection 88 is provided on the second side wall 52 and the first and second shoulders are provided on the circumferential portion 48, wherein the first shoulder is the internal shoulder 78, and the second shoulder is shown at 90.

Some additional optional components of the crankshaft pulley 28 are shown in FIGS. 2-4. For example, the crankshaft pulley 28 may include an integrated torsional vibration damping structure 94 that includes a rubber layer 95 on the cage 45, and an inertia member 96 on the rubber layer. Bushing members 97 and 98 are provided for supporting the movement of the inertia member 96 relative to the cage 45. A suitable fluid, such as oil, may be present in the chamber 56, which serves several functions, including providing viscous damping between the inertia member 96 and the bushing members 97 and 98. Due to the presence of the oil, the chambered member 46 needs to be sealed sufficiently to prevent oil leakage between the circumferential portion 48 and the second side wall 52.

A method of making a chambered member, such as the chambered member 46, for a rotary device (e.g. crankshaft pulley 28), is illustrated in FIGS. 7A-7D and FIG. 8. The method in step form is shown at 100 in FIG. 8. The method, specifically as applied to the chambered member 46 and the rotary device 10 is illustrated in FIGS. 7A-7D. The method 100 includes a step 102 which is to provide a circumferential portion, such as the circumferential portion 48. The circumferential portion provided in step 102 has an exterior drive surface (e.g. exterior drive surface 54) thereon, which is engageable with an external torque member (e.g. accessory drive belt 22), so as to transmit torque between the external torque member and the rotary device. The circumferential portion has an internal shoulder, (e.g. internal shoulder 78), and a cylindrical extension wall shown at 91 in FIG. 7A, that extends axially from the internal shoulder. Step 104 includes providing a first side wall (e.g. first side wall 50). The first side wall and the circumferential portion together partially enclose a chamber (e.g. chamber 56). In the example shown, the first side wall and the circumferential portion are made from a single piece of material. It will be understood, however, that this need not be the case. It is possible for the first side wall to be a separate piece from the circumferential portion and to be joined to the circumferential portion in any suitable way. Step 106 includes providing a second side wall (e.g. the second side wall 52) as a separate member from the circumferential portion. The second side wall has an inner side wall surface (e.g. surface 82), an outer side wall surface (e.g. surface 84) and an edge face (e.g. edge face 66) between the inner and outer side wall surfaces. One of the second side wall and the circumferential portion has a first torque transfer surface (e.g. torque transfer surface 62) with a plurality of projections (e.g. projections 64) thereon, that extend at least partially axially or partially radially. The other of the circumferential portion and the second side wall has a second torque transfer surface (e.g. second torque transfer surface 68) thereon. In the present example, the projections extend axially and are on the first torque transfer surface. Step 108 includes mounting the second side wall on the circumferential portion such that the second side wall is supported by the internal shoulder. Once in place, the inner side wall surface in part defines the chamber, and the edge face faces a first axial portion (shown at 92 in FIG. 7A) of the cylindrical extension wall 91. This first portion 92 of the cylindrical extension wall 91 is the surrounding wall 71 mentioned above.

Step 110 includes providing a seal member. The seal member provided may be any suitable seal member, such as the o-ring 74. Other suitable types of seal member are described herein also. Step 112 includes folding over a second axial portion shown at 93 of the cylindrical extension wall 91 against the outer side wall surface 84, thereby sandwiching an axial locking projection (e.g. the axial locking projection 88) on the second side wall axially between the internal shoulder on the circumferential portion and a second shoulder (e.g. second shoulder 90) on the circumferential portion formed by the second axial portion, so as to lock the second side wall axially relative to the circumferential portion, and so as to compress the seal member between the second side wall and the circumferential portion.

During at least one of steps d) and f) the plurality of projections project into and deform the second torque transfer surface to generate a plurality of valleys in the second torque transfer surface that have no clearance in a circumferential direction (shown at DIRC in FIGS. 5 and 6) with the plurality of projections, such that the first torque transfer surface and the second torque transfer surface can transfer a torque of at least 10 Nm into one another without plastic deformation of the second side wall and of the circumferential portion.

Figure 7A:
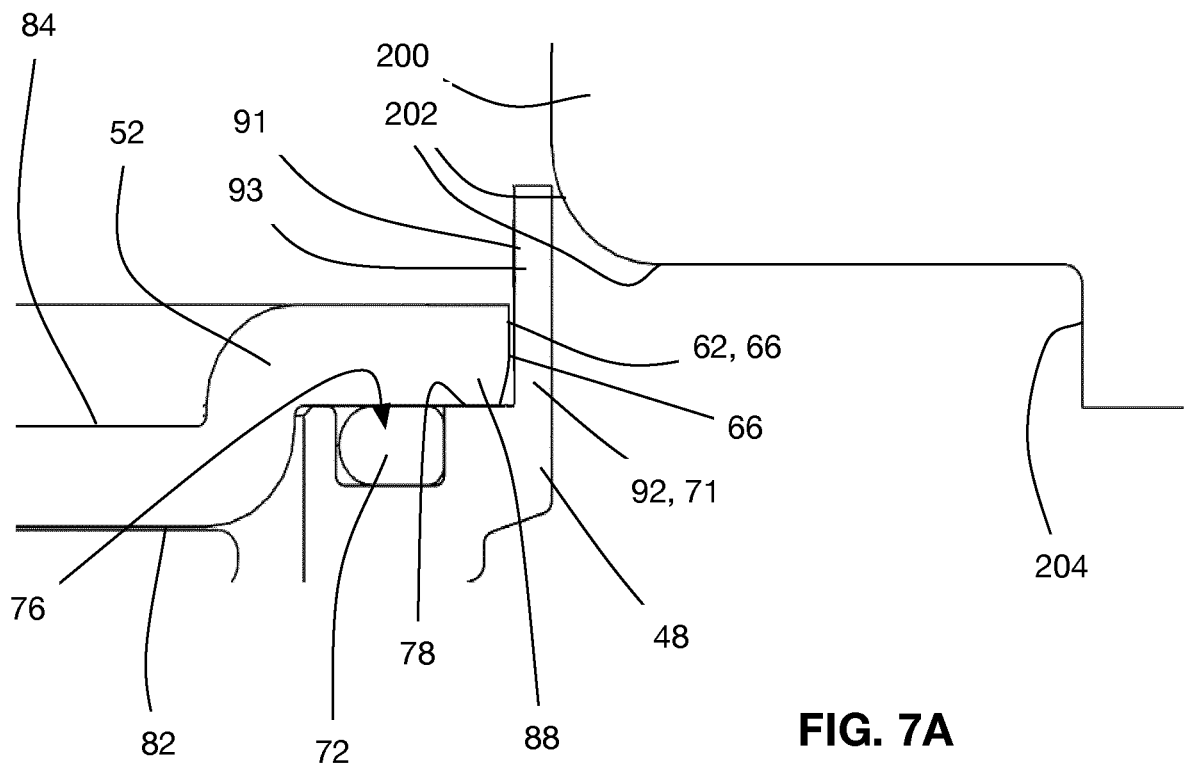
Figure 7B:
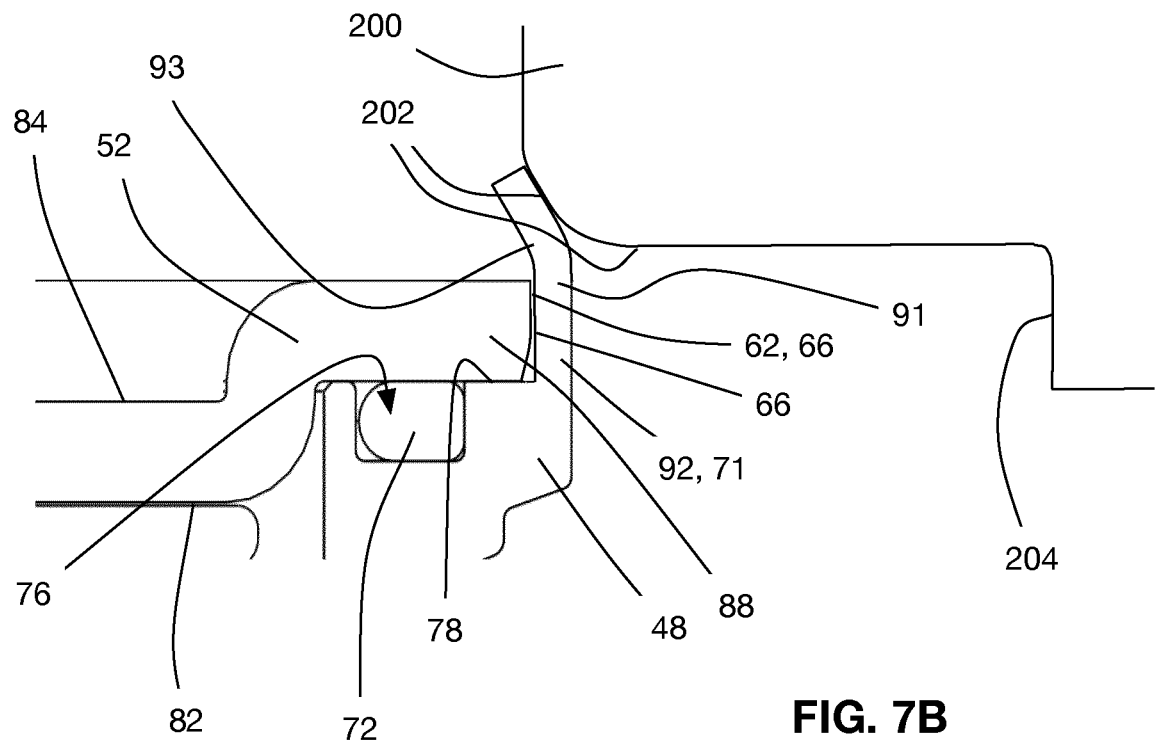
Figure 7C:
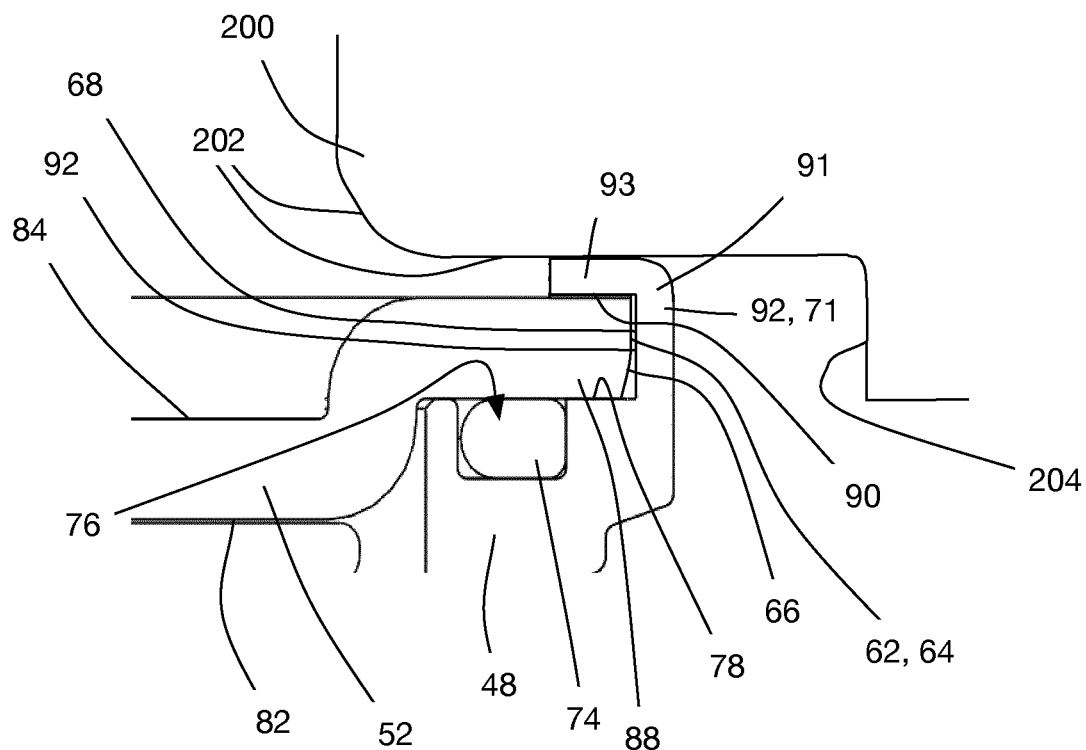
Figure 7D:
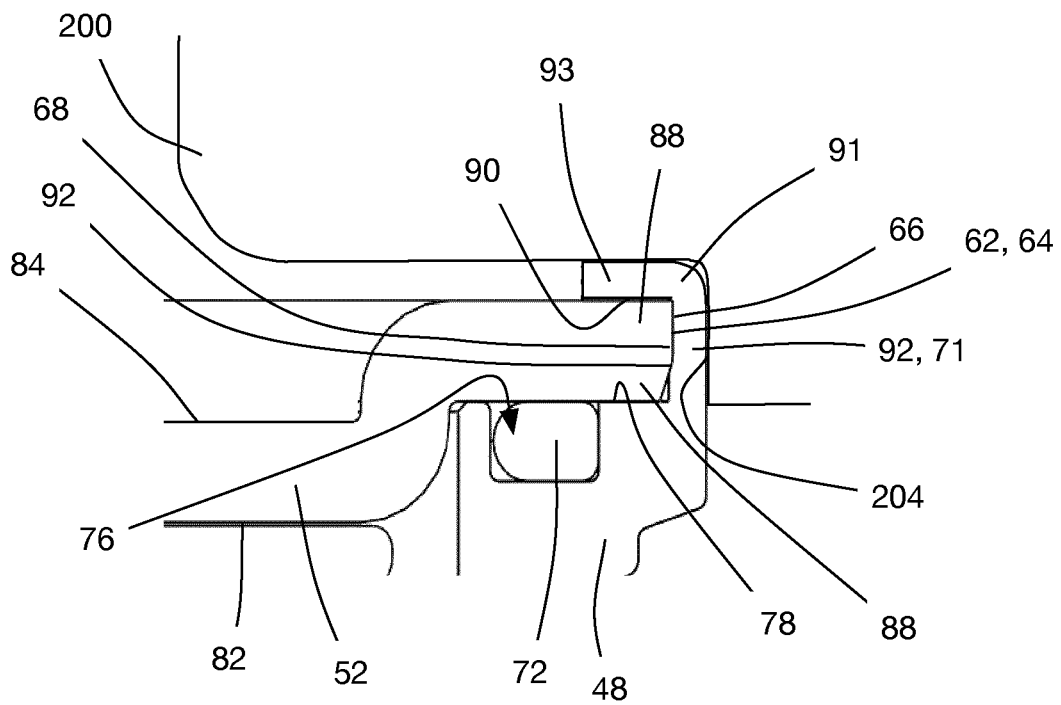

FIGS. 7A-7D illustrate steps in the method 100. FIG. 7A illustrates step 106, namely mounting the second side wall on the circumferential portion. FIG. 7B illustrates an initial stage of step 112, namely folding over the second axial portion 93 of the cylindrical extension wall 91 against the outer side wall surface 84 of the second side wall 52. A way of accomplishing step 112 is to bring in a roller 200 that has a folding surface 202. By rotating the chambered member 46 against the folding surface 202 and by bringing the folding surface 202 and the chambered member 46 towards one another, engagement of the folding surface 202 and the cylindrical extension wall 91 progressively folds over the cylindrical extension wall 91 as can be seen in FIGS. 7B and 7C. The roller 200 may further include a projection insertion surface 204. By rotating the chambered member 46 against the folding surface 202 and by bringing the projection insertion surface 204 and the chambered member 46 towards one another, engagement of the projection insertion surface 204 and the cylindrical extension wall 91 progressively drives the plurality of projections 64 into engagement (or further into engagement, as the case may be) with the second torque transfer surface 68 (FIG. 7D) so as to generate the plurality of valleys 70 shown in FIG. 6.

In order to generate the plurality of valleys 70 is may be beneficial for the first torque transfer surface to have a first hardness and for the second torque transfer surface have a second hardness that is at most the same as the first hardness. For greater certainty, however, it will be noted that it is possible for the first hardness to be a bit less than the second hardness, and for the plurality of projections 64 to generate valleys 70 just based on the shape of the projections 64 (e.g. being pointed).

While the steps 102-112 are represented in FIG. 8 as being sequential it will be noted that they do not need to be carried out in the order in which they are shown in FIG. 8. For example, step 104 need not occur after step 102. For example, steps 110, 104 and 102 could occur simultaneously, or in any order. Step 110, for example, could occur before steps 104 and 102. Where any steps occur simultaneously, they do not need to occur precisely simultaneously. In other words they do not have to start and stop at precisely the same instants as one another. Occurring simultaneously means that there is some overlap in the operation of two or more steps.

While a roller 200 has been described as a structure that can be used to drive the projections 64 and the second torque transfer surface 68 into engagement with one another to generate the valleys 70, there are other ways of achieving the generation of the valleys 70. For example, prior to insertion of the second side wall 52 onto the circumferential portion 48, one could heat the circumferential portion 48 so as to cause thermal expansion thereof. Due to the thermal expansion of the circumferential portion 48, there is a gap between the projections 64 and the second torque transfer surface 68. After placement of the second side wall 52 on the circumferential portion 48, the circumferential portion 48 may be cooled so that it contracts thermally. During this thermal contraction, the projections 64 may contact and dig into the second torque transfer surface 68 to generate the valleys 70.

In another embodiment, there may be an interference fit between the second side wall 52 and the circumferential portion 48, and the second side wall 52 may be pressed into the circumferential portion 48 thereby generating the valleys 70 at that time.

While the projections 64 have been described as having been formed during stamping of the second side wall 52, it will be understood that the projections 64 may be provided by any other suitable process, such as knurling.

FIGS. 9A-9G show a number of alternative embodiments for the chambered member 46. FIG. 9A shows an embodiment of the chambered member 46 in which the o-ring 74 is replaced by an elastomeric layer 300. The elastomeric layer 300 forms part of the axial locking projection 88 and is overmolded on the outer side wall surface 84, and is therefore compressed between the outer side wall surface 84 and the second shoulder 90. In the embodiment shown in FIG. 9A, the elastomeric layer 300 is overmolded on all of the outer side wall surface 84 that would otherwise be exposed to atmosphere but for the overmolded elastomeric layer 300 thereon. This includes, for example, the portion of the outer side wall surface 84 shown at 302 that is adjacent to the portion that is covered by the folded-over second portion 93 of the cylindrical extension wall 91. An advantage provided by the embodiment shown in FIG. 9A, is that the second side wall 52 may not require any treatment for corrosion resistance as a result of the overmolded elastomeric layer 300. By contrast, in the embodiment shown in FIG. 4, the second side wall 52 may either be made from a material that is itself corrosion resistant, or may require a coating of corrosion resistant material to protect it during the operating life of the chambered member 46. In some embodiments, however, the elastomeric layer 300 may be provided in the region of the outer side wall surface 84 that is covered by the folded-over second portion 93, in which case, a corrosion-resistant coating may be provided as appropriate for the second side wall 52, depending on the application.

It is important to know that the use of the elastomeric layer 300 provides an advantage, which is that the seal can be inspected to some degree to determine if it appears to be defective or not, whereas in embodiments that incorporate an o-ring, the o-ring is generally unviewable by a person since it is buried beneath the second side wall 52, making it more difficult to inspect to determine if it pinched or is otherwise defective.

While the elastomeric layer 300 is shown to be overmolded on the outer side wall surface 84 it is possible to provide the elastomeric layer 300 on the inner side wall surface 82 instead, such that the elastomeric layer 300 would be compressed between the inner side wall surface 82 and the internal shoulder 78. In such an embodiment it would not be advantageous to cover the entire inner side wall surface 82 with the elastomeric layer 300.

While the use of an elastomeric layer 300 has been shown, it is alternatively possible to provide a layer that is formed from a UV-cured sealant, a glue, a self-expanding foam material, or an RTV (room-temperature vulcanizing) silicone that does not require UV to cure.

FIG. 9B shows another embodiment which is similar to the embodiment shown in FIG. 4, except that the first torque transfer surface 62, which has the plurality of projections 64 thereon is provided on the cylindrical extension wall 91 on the circumferential portion 48, and the second torque transfer surface 68 is provided on the edge face 66 of the second side wall 52. The second side wall 52 is shown as transparent in FIG. 9B in order to not obscure the portion of the circumferential portion 48 behind it. Since the projections 64 are provided on both the first portion 92 and the second portion 93 of the cylindrical extension wall 91 in the embodiment shown in FIG. 9B, the second torque transfer surface 68 may be present on one or both of the edge face 66 and the outermost portion of the upper side wall surface 84 of the second side wall 52. The second torque transfer surface 68 is identified in both of these places in FIG. 9B. In the event that the second torque transfer surface 68 is only intended to be present on the outermost portion of the upper side wall surface 84 of the second side wall 52, the act of folding the second portion 93 of the cylindrical extension wall 91 down onto the upper side wall surface 84 will simultaneously generate valleys 70 in the second side wall 52. Accordingly, there would not be a need for the step of urging the roller 200 to the position in FIG. 7D to drive the first portion of the cylindrical extension wall 91 and the edge face 66 of the second side wall 52 into engagement with one another.

FIG. 9C illustrates an embodiment that is similar to the embodiment shown in FIG. 9B, except that the plurality of projections 64 are only provided on the second portion 93 of the cylindrical extension wall 91, which is the portion of the cylindrical extension wall 91 that forms the second shoulder 90. Accordingly, the second torque transfer surface 68 would be present only on the outermost portion of the upper side wall surface 84.

FIG. 9D illustrates an embodiment that is similar to the embodiment shown in FIG. 9C, except that the plurality of projections 64 are provided on the internal shoulder 78 instead of being provided on portion that forms the second shoulder 90. Accordingly, the second torque transfer surface 68 would be present on the outermost portion of the inner side wall surface 82. In the embodiments shown in FIGS. 9B, 9C and 9D, the seal member is shown to be the o-ring 74, which is mounted in the groove in the internal shoulder 78 of the circumferential portion 48. The second side wall 52 is shown as transparent in FIG. 9B in order to not obscure the portion of the circumferential portion 48 behind it.

FIG. 9E illustrates an embodiment that is similar to the embodiment shown in FIG. 9A, in that the seal member is provided as the elastomeric layer 300 on the outer side wall surface 84. A difference with the embodiment shown in FIG. 9E is that the plurality of projections 64 are provided on the outermost portion of the inner side wall surface 82 instead of being provided on the edge face 66. Accordingly, the second torque transfer surface 68 would be present on the internal shoulder 78.

FIG. 9F illustrates an embodiment in which the circumferential portion 48 does not have an internal shoulder, nor a cylindrical extension wall. Instead, the second side wall 52 has a cylindrical extension wall 402 that has a first portion 404 and a second portion 406, and which is radially outside the circumferential portion 48. Once the second side wall 52 is placed on the circumferential portion 48, the first portion 404 faces the o-ring 74 which sits in a groove 76 that is on the radially outer surface of the circumferential portion 48. The second portion 406 faces a locking groove 408 that has a first shoulder 410 and a second shoulder 412 circumferential portion 48. The plurality of projections 64 may be provided on an axial rim 414 of the circumferential portion 48, and the second torque transfer surface 68 may be provided on the portion of the second side wall 52 that faces the plurality of projections 64.

A suitably shaped roller (not shown) can then be brought into engagement with the outer side wall surface 84 so as to drive the plurality of projections 64 into the second torque transfer surface 68. The suitably shaped roller can then be brought into engagement with the first portion 404 of the cylindrical extension wall 402 so as to drive the first portion 404 into engagement (or greater engagement) with the o-ring 74 so as to form a strong seal. The suitably shaped roller can also be brought into engagement with the second portion 406 so as to drive some of the second portion 406 into the groove 408 and into engagement with the first and second shoulders 410 and 412.

FIG. 9G illustrates an embodiment that is similar to the embodiment shown in FIG. 4, in that the plurality of projections 64 are provided on the edge face 66 of the second side wall 52. However, the second side wall 52 in FIG. 9G includes a cylindrical extension wall 500 that is radially inside the cylindrical extension wall 91 of the circumferential portion 48. An o-ring 74 is provided in a groove 76 in the cylindrical extension wall 500. A suitably shaped roller (not shown) drives engagement between the cylindrical extension wall 91 and the cylindrical extension wall 500 so as to generate the valleys 70 in the cylindrical extension wall 91 and to provide a strong seal with the o-ring 74.

For greater certainty, the method 100 illustrated in FIG. 8 can be carried out to produce the embodiments shown in FIGS. 9A-9E and 9G. A method in accordance with an alternative embodiment to the method 100 can be provided, which may be similar to the method 100. A difference is that, in the alternative method, the circumferential portion provided in step 102 is replaced by a similar step of providing a circumferential portion having an exterior drive surface thereon, wherein the exterior drive surface is engageable with an external torque member so as to transmit torque between the external torque member and the rotary device, and wherein the circumferential portion has a groove (e.g. groove 408). Another difference is that, in the alternative method, the step 106 is replaced by an alternative step in which the second side wall that is provided is a separate member from the circumferential portion, and has an inner side wall surface, an outer side wall surface and an edge face between the inner and outer side wall surfaces, and further has a cylindrical extension wall (e.g. cylindrical extension wall 402). The cylindrical extension wall of the second side wall is radially outside the circumferential portion, and a portion of the cylindrical extension wall is in the groove.

While the pulleys 24, 26 and 28, and the accessory drive belt 22 are provided in the embodiments shown in the figures, it will be understood that the pulleys 24, 26 and 28 are but examples of suitable rotary devices that could be used in accordance with the present disclosure. Thus, the crankshaft pulley 28 may more broadly be referred to as a rotary device 600. Accordingly, the belt engagement surface 54 that engages the belt 22, is but an example of a suitable exterior drive surface (shown at 602) that could be provided on the rotary device 600. Correspondingly, the belt 22 is but an example of an external torque member (shown at 604) that is engageable with the exterior drive surface 602 of the rotary device 600 so as to transmit torque between the external torque member 604 and the rotary device 600. In other examples, the external torque member 604 may be a timing belt, a timing chain, or a gear, and the exterior drive surface 602 of the rotary device 600 may be configured accordingly.

While the rotary device 600 shown in FIGS. 1-9G is mounted to the crankshaft 16, it will be noted that a rotary device in accordance with the present disclosure could be mounted to a shaft that is connected to a rotational functional element of a vehicle accessory, such as a shaft of a rotor of the MGU 20c.

While the crankshaft pulley 28 is shown as an isolation pulley that includes a torsional vibration damping structure therein, it will be understood that the isolation springs 44 are but examples of suitable internal torque transfer members shown at 606. More broadly speaking, the rotary device 600 includes at least one internal torque transfer member 606 in the chamber 56, which is positioned to transfer torque between the shaft adapter 34 and the second side wall 52.

An example of a rotary device 600 that incorporates an internal torque transfer member 606 that is not an isolation spring, is shown in FIGS. 10A and 10B. The rotary device 600 shown is a dual pulley structure 610 for use on an MGU in a system that incorporates a first belt (not shown) that extends between a crankshaft and a first pulley 612 and a second belt (not shown) that extends between a second pulley 614 and additional accessories, thereby permitting control over whether the crankshaft 16 drives the additional accessories and the MGU, or whether the MGU drives the additional accessories. In the dual pulley structure 610, the second pulley 614 includes a circumferential portion 616 with an external drive surface 618 thereon for engagement with the second belt, a second side wall 620, and a first side wall that may be made up of a plurality of components to support the circumferential portion 616, including a first splined member 622, a second splined member 624, and a plurality of other structural elements shown at 626, 628, 630, and 632.

The second side wall 620 has a second side wall spline arrangement 636 thereon, that engages with a shaft spline arrangement 638 on the MGU shaft shown at 640.

The second side wall 620 has an edge face 642 with a first torque transfer surface 644 thereon, that has a plurality of projections 646. The circumferential portion has an internal shoulder 648 (which may also be referred to as a first shoulder 648), and a cylindrical extension wall 650 that extends therefrom. The cylindrical extension wall includes a first portion 652 that has a second torque transfer surface 654 thereon and a second portion 656. To manufacture the second pulley 614 a roller (not shown) that is similar to the roller 200 can be used to fold over the second portion 656 of the cylindrical extension wall 650 to form a second shoulder 658 that engages the outer side wall surface (shown at 660) of the second side wall 620, and to press the first portion 652 of the cylindrical extension wall 650 into engagement (or more engagement) with the plurality of projections 646 to as to generate valleys. The projections 646 and the valleys are the same as the projections 64 and the valleys 70 in FIG. 6. A seal member is not shown but could be provided in any suitable place, such as on the internal (first) shoulder 648, in embodiments of the dual pulley structure 610 in which a fluid such as a lubricating oil is provided inside the chamber formed in the second pulley 614 (shown at 664).

FIG. 10C shows another embodiment of a rotary device 600 in accordance with the present disclosure. The rotary device 600 in FIG. 10C is in the form of a viscous torsional vibration damper (TVD) 700. The viscous TVD 700 includes an inertia member 702 that is a chambered member. The inertia member 702 has a circumferential portion 704, a first side wall 706 and a second side wall 708. The viscous TVD further includes a shaft adapter 710 that includes a support member 711 for the inertia member 702. A suitable liquid shown at 713 such as oil may be provided in the U-shaped chamber 712 so as to provide viscous damping during relative movement between the inertia member 702 and the support member 711.

The quantity of oil 713 may, in this embodiment, constitute the internal torque transfer member. The structure of the connection between the circumferential portion 704 and the second side wall 708 may be similar to the structure of the connection shown between the circumferential portion 48 and the second side wall 52 in FIG. 4, and may thus incorporate an internal shoulder 720 on the circumferential portion 704, a cylindrical extension wall 722 extending therefrom, including a first portion 724 and a second portion 726, wherein the first portion 724 has a second torque transfer surface 727, while an edge face 728 of the second side wall 708 has a first torque transfer surface 730 thereon with a plurality of projections 732 that generate valleys in the second torque transfer surface 726. The second portion of the cylindrical extension wall 722 is folded over to form a second shoulder 734 to hold the second side wall 708. A seal member 736 is provided on the internal shoulder 720. All of these components, namely, the cylindrical extension wall, the internal shoulder, the seal member 736, and the first and second torque transfer surfaces 730 and 726, are functionally similar to their counterparts in the embodiment shown in FIG. 4.

Persons skilled in the art will appreciate that there are yet more alternative implementations and modifications possible, and that the above examples are only illustrations of one or more implementations. The scope, therefore, is only to be limited by the claims appended hereto and any amendments made thereto.

The following table of elements is provided:

| Item Name | Reference No. | Figure(s) |
|---|---|---|
| Engine | 10 | 1 |
| Cylinder | 12 | 1 |
| Piston | 14 | 1 |
| Crankshaft | 16 | 1 |
| Connecting Rod | 18 | 1 |
| Accessories | 20 | 1 |
| Water pump | 20a | 1 |
| Air conditioning compressor | 20b | 1 |
| MGU (motor-generator unit) | 20c | 1 |
| Accessor drive belt | 22 | 1 |
| Drive shaft | 24 | 1 |
| Accessory pulley | 26 | 1 |
| Crankshaft pulley | 28 | 1 |
| Idler pulley | 30 | 1 |
| Tensioner | 32 | 1 |
| Tensioner arm | 33 | 1 |
| Shaft adaptor | 34 | 2 |
| Flywheel | 35 | 1 |
| Sleeve portion | 36 | 4 |
| Starter motor | 37 | 1 |
| End of crankshaft | 38 | 2 |
| Pass-through apertures | 40 | 2 |
| Drive arms | 42 | 2 |
| Isolation springs | 44 | 2 |
| Cage | 45 | 4 |
| Chambered member | 46 | 2, 4 |
| Lugs | 47 | 2 |
| Circumferential portion | 48 | 2, 3, 4, 5 |
| Lugs | 49 | 3 |
| First side wall | 50 | 2, 3, 4, 5 |
| Second side wall | 52 | 2, 3, 4, 5 |
| Exterior drive surface | 54 | 2, 3, 4, 5 |
| Chamber | 56 | 4 |
| First seal member | 58 | 2, 3, 4, 5 |
| Second seal member | 60 | 2, 3, 4, 5 |
| First torque transfer surface | 62 | 6 |
| Projections | 64 | 6 |
| Edge face | 66 | 6 |

-continued

| Item Name | Reference No. | Figure(s) |
|---|---|---|
| Second torque transfer surface | 68 | 6 |
| Valleys | 70 | 6 |
| Surrounding wall | 71 | 7A-7D |
| Seal member | 72 | 2, 3, 4, 5 |
| O-ring | 74 | 2, 3, 4, 5 |
| Groove | 76 | 7A-7D |
| Internal shoulder/first shoulder | 78 | 5, 7A-7D |
| Inner side wall surface | 82 | 3, 7A-7D |
| Outer side wall surface | 84 | 2, 7A-7D |
| Axial locking projection | 88 | 7A-7D |
| Second shoulder | 90 | 7D |
| Cylindrical extension wall | 91 | 5, 7A-7D |
| First portion | 92 | 7A-7D |
| Second portion | 93 | 7A-7D |
| Torsional vibration damping structure | 94 | 2, 3, 4, 5 |
| Rubber layer | 95 | 2, 3, 4, 5 |
| Inertia member | 96 | 2, 3, 4, 5 |
| Bushing member | 97 | 2, 3, 4, 5 |
| Bushing member | 98 | 2, 3, 4, 5 |
| Method | 100 | 8 |
| Step | 102 | 8 |
| Step | 104 | 8 |
| Step | 106 | 8 |
| Step | 108 | 8 |
| Step | 110 | 8 |
| Step | 112 | 8 |
| Roller | 200 | 7A-7D |
| Folding surface | 202 | 7A-7D |
| Projection insertion surface | 204 | 7A-7D |
| Elastomeric layer | 300 | 9A |
| Portion of the outer side wall surface | 302 | 9A |
| Cylindrical extension wall | 402 | 9F |
| First portion | 404 | 9F |
| Second portion | 406 | 9F |
| Groove | 408 | 9F |
| First shoulder | 410 | 9F |
| Second shoulder | 412 | 9F |
| Axial rim | 414 | 9F |
| Cylindrical extension wall | 500 | 9G |
| Rotary device | 600 | 4, 10A |
| Exterior drive surface | 602 | 4, 10A |
| External torque member | 604 | 1 |
| Internal torque transfer member | 606 | 2, 3, 11 |
| Dual pulley structure | 610 | 10A |
| First pulley | 612 | 10A |
| Second pulley | 614 | 10A |
| Circumferential portion | 616 | 10A |
| External drive surface | 618 | 10A |
| Second side wall | 620 | 10A |
| First splined member | 622 | 10A |
| Second splined member | 624 | 10A |
| Structural element | 626 | 10A |
| Structural element | 628 | 10A |
| Structural element | 630 | 10A |
| Structural element | 632 | 10A |
| Structural element | 634 | 10A |
| Second side wall spline arrangement | 636 | 10A |
| Shaft spline arrangement | 638 | 10A |
| MGU shaft | 640 | 10A |
| Edge face | 642 | 10A |
| First torque transfer surface | 644 | 10A |
| Projections | 646 | 10A |
| Internal shoulder/first shoulder | 648 | 10A |
| Cylindrical extension wall | 650 | 10A |
| First portion | 652 | 10A |
| Second torque transfer surface | 654 | 10A |
| Second portion | 656 | 10A |
| Second shoulder | 658 | 10A |
| Outer side wall surface | 660 | 10A |
| Second pulley | 664 | 10A |
| Torsional vibration Damper | 700 | 11 |
| Inertia member | 702 | 11 |
| Circumferential portion | 704 | 11 |
| First side wall | 706 | 11 |
| Second side wall | 708 | 11 |
| Shaft adapter | 710 | 11 |
| Support member | 711 | 11 |
| Chamber | 712 | 11 |
| Liquid | 713 | 11 |
| Internal shoulder | 720 | 11 |
| Cylindrical extension wall | 722 | 11 |
| First portion | 724 | 11 |
| Second torque transfer surface | 727 | 11 |
| Edge face | 728 | 11 |
| First torque transfer surface | 730 | 11 |
| Projections | 732 | 11 |
| Second shoulder | 734 | 11 |
| Seal member | 736 | 11 |

What is claimed is:

1. A rotary device, comprising:
a shaft adapter that is connectible to a shaft that is either an engine crankshaft or is an accessory shaft that holds a rotational functional element of a vehicle accessory, wherein the shaft adapter defines an axis;
a chambered member that is rotatably connected to the shaft adapter, wherein the chambered member, and wherein the chambered member at least partially encloses a chamber,
wherein the chambered member includes a circumferential portion, a first side wall, and a second side wall, wherein the second side wall is a separate member from the circumferential portion,
wherein, one of the circumferential portion and the second side wall has a first torque transfer surface with a plurality of projections thereon that extend at least partially axially or partially radially, and the other of the circumferential portion and the second side wall has a second torque transfer surface thereon with a plurality of valleys that mate with the plurality of projections with no clearance therebetween in a circumferential direction, such that the first torque transfer surface and the second torque transfer surface can transfer a torque of at least 10 Nm into one another without plastic deformation of the second side wall and of the circumferential portion;
a seal member that is compressed between the second side wall and the circumferential portion, wherein one of the second side wall and the circumferential portion has an axial locking projection that is sandwiched axially between a first shoulder and a second shoulder in the other of the second side wall and the circumferential portion with no axial clearance between the axial locking projection and the first and second shoulders, so as to lock the second side wall axially relative to the circumferential portion; and
at least one internal torque transfer member in the chamber, and positioned to transfer torque between the shaft adapter and the second side wall.

2. A rotary device as claimed in claim 1, wherein the circumferential portion includes a surrounding wall that surrounds and engages the edge face.

3. A rotary device as claimed in claim 2, wherein a first one of the surrounding wall and the edge face has a plurality of projections that engage a plurality of valleys in a second one of the surrounding wall and the edge face to rotationally lock the second side wall to the circumferential portion, wherein the surrounding wall is bent over to engage the outer side wall surface so as to axially lock the second side wall to the circumferential portion.

4. A rotary device as claimed in claim 1, wherein the at least one internal torque transfer member is positioned to transfer torque between the shaft adapter and both the second side wall and the first side wall simultaneously.

5. A rotary device as claimed in claim 1, wherein the first side wall and the circumferential portion are formed from a single piece of material.

6. A rotary device as claimed in claim 1, wherein the chambered member has an exterior drive surface on the circumferential portion, that is engageable with an external torque member, so as to transmit torque between the external torque member and the rotary device.

7. A rotary device as claimed in claim 6, wherein the exterior drive surface is a poly-V groove surface, and the external torque transfer member is an accessory drive belt.

8. A rotary device as claimed in claim 1, wherein the seal member is an o-ring that is positioned in a groove in the first shoulder.

9. A rotary device as claimed in claim 1, wherein the seal member is an elastomeric layer that is overmolded on one of the axial locking projection, the first shoulder and the second shoulder.

10. A rotary device as claimed in claim 1, wherein the axial locking projection is provided on the second side wall and the first and second shoulders are provided on the circumferential portion.

11. A rotary device as claimed in claim 1, wherein the axial locking projection is provided on the second side wall and the first and second shoulders are provided on the circumferential portion, and wherein the second side wall has an inner side wall surface that faces the chamber and an outer side wall surface that is opposite the inner side wall surface, wherein the seal member is an elastomeric layer that forms part of the axial locking projection and is overmolded on the outer side wall surface and is compressed between the outer side wall surface and the second shoulder.

12. A rotary device as claimed in claim 11, wherein the elastomeric layer is overmolded on all of the outer side wall surface that would otherwise be exposed to atmosphere but for the overmolded elastomeric layer thereon.

13. A rotary device as claimed in claim 1, wherein said first torque transfer surface has a first hardness and the second torque transfer surface has a second hardness that is at most the same as the first hardness.

* * * * *